US011451362B2

(12) United States Patent
Ma et al.

(10) Patent No.: US 11,451,362 B2
(45) Date of Patent: Sep. 20, 2022

(54) SYSTEMS AND METHODS FOR NON-CELLULAR WIRELESS ACCESS USING LOGICAL ENTITY IDS IN A HYPER CELL

(71) Applicant: Huawei Technologies Co., Ltd., Shenzhen (CN)

(72) Inventors: Jianglei Ma, Ottawa (CA); Ming Jia, Ottawa (CA); Peiying Zhu, Kanata (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 16/573,267

(22) Filed: Sep. 17, 2019

(65) Prior Publication Data

US 2020/0014521 A1 Jan. 9, 2020

Related U.S. Application Data

(63) Continuation of application No. 14/550,362, filed on Nov. 21, 2014, now Pat. No. 10,454,654.
(Continued)

(51) Int. Cl.
*H04W 76/00* (2018.01)
*H04L 5/00* (2006.01)
(Continued)

(52) U.S. Cl.
CPC .......... *H04L 5/0073* (2013.01); *H04W 48/20* (2013.01); *H04W 76/11* (2018.02); *H04W 36/385* (2013.01)

(58) Field of Classification Search
CPC .... H04L 5/0073; H04W 48/20; H04W 76/021
See application file for complete search history.

(56) References Cited

U.S. PATENT DOCUMENTS 7,826,426 B1  11/2010  Bharghavan et al.
8,965,443 B2   2/2015  Gao et al.
(Continued)

FOREIGN PATENT DOCUMENTS

CN       101583151 A    11/2009
CN       103718612 A     4/2014
(Continued)

OTHER PUBLICATIONS

Lee, J. et al., "Coordinated Multipoint Transmission and Reception in LTE-Advanced Systems," Technology Updates on LTE Advanced, IEEE Communications Magazine, Nov. 2012, 7 pages.
(Continued)

*Primary Examiner* — Pakee Fang
(74) *Attorney, Agent, or Firm* — Slater Matsil, LLP

(57) ABSTRACT

System and method embodiments are provided for non-cellular wireless access. In an embodiment, a method for non-cell grid based radio access in a radio access network includes determining, by a controller, a group of transmit points (TPs) to assign to a logical entity; assigning, by the controller, a logical entity identifier (ID) to the logical entity, wherein the logical entity ID identifies the logical entity through which a user equipment (UE) communicates with the radio access network; and causing, by the controller, at least one of the TPs in the logical entity to send signals to the UE.

23 Claims, 8 Drawing Sheets

Related U.S. Application Data

(60) Provisional application No. 61/907,271, filed on Nov. 21, 2013.

(51) Int. Cl.
  *H04W 76/11* (2018.01)
  *H04W 48/20* (2009.01)
  *H04W 36/38* (2009.01)

(56) References Cited

U.S. PATENT DOCUMENTS

| | | | |
|---|---|---|---|
| 2003/0129984 | A1 | 7/2003 | Dent |
| 2003/0133422 | A1 | 7/2003 | Bims |
| 2003/0206531 | A1 | 11/2003 | Shpak |
| 2003/0207697 | A1 | 11/2003 | Shpak |
| 2004/0252696 | A1 | 12/2004 | Kakishima et al. |
| 2006/0234756 | A1 | 10/2006 | Yamasaki et al. |
| 2008/0025275 | A1 | 1/2008 | Cheng et al. |
| 2008/0171553 | A1 | 7/2008 | Ren et al. |
| 2008/0289009 | A1 | 11/2008 | Lee et al. |
| 2010/0027469 | A1* | 2/2010 | Gurajala ............... H04W 24/00 370/328 |
| 2010/0054237 | A1 | 3/2010 | Han et al. |
| 2011/0096736 | A1 | 4/2011 | Kwon et al. |
| 2011/0299499 | A1* | 12/2011 | Kojima ............. H04L 29/12264 370/329 |
| 2011/0312316 | A1* | 12/2011 | Baldemair ............ H04L 5/0073 455/422.1 |
| 2012/0082022 | A1 | 4/2012 | Damnjanovic et al. |
| 2012/0320817 | A1 | 12/2012 | Xu et al. |
| 2013/0028180 | A1 | 1/2013 | Gao et al. |
| 2013/0051214 | A1 | 2/2013 | Fong et al. |
| 2013/0142118 | A1* | 6/2013 | Cherian ................. H04L 45/00 370/328 |
| 2013/0210436 | A1 | 8/2013 | Srinivasan et al. |
| 2013/0244569 | A1* | 9/2013 | Dunn ............... H04W 36/0061 455/11.1 |
| 2014/0126438 | A1* | 5/2014 | Zhu ..................... H04J 11/0093 370/311 |
| 2014/0204809 | A1* | 7/2014 | Kim .................... H04J 13/0062 370/280 |
| 2014/0370889 | A1 | 12/2014 | Zhu et al. |
| 2015/0043530 | A1 | 2/2015 | Bharghavan et al. |
| 2015/0094077 | A1* | 4/2015 | Lin ...................... H04W 48/12 455/452.1 |
| 2015/0341877 | A1* | 11/2015 | Yi ....................... H04W 56/001 370/350 |
| 2016/0066291 | A1* | 3/2016 | Awad .................. H04B 7/2656 370/350 |
| 2016/0174124 | A1 | 6/2016 | Basu Mallick et al. |

FOREIGN PATENT DOCUMENTS

| | | |
|---|---|---|
| JP | 2001251656 A | 9/2001 |
| JP | 2005514882 A | 5/2005 |
| JP | 2005535254 A | 11/2005 |
| JP | 2006295664 A | 10/2006 |
| JP | 2013509776 A | 3/2013 |
| WO | 2006074591 A1 | 7/2006 |
| WO | 2012099322 A1 | 7/2012 |
| WO | 2013046024 A1 | 4/2013 |

OTHER PUBLICATIONS

Li, Y. et al., "Base Station Sleeping with Dynamical Clustering Strategy of CoMP in LTE-Advanced," 2013 IEEE International Conference on Green Computing and Communications and IEEE Internet of Things and IEEE Cyber, Physical and Social Computing, IEEE Computer Society, Aug. 20-23, 2013, 6 pages.

"3rd Generation Partnership Project; Technical Specification Group Radio Access Network; Evolved Universal Terrestrial Radio Accress (E-UTRA); Physical channels and modulation (Release 11)", 3GPP TS 36.211, V11.4.0, Sep. 2013, 120 Pages.

Chiang, J,. et al., Accurate Clock Synchronization for IEEE 802.11-Based Multi-Hop Wireless Networks, 17th IEEE International Conference, Oct. 2009, 10 Pages.

"Information technology—Telecommunications and information exchange between systems—Local and Metroplitan area networks—Specific Requirements—Part 11: Wireless LAN medium access control (MAC) and physical layer (PHY) specifications", International Standard, ISP/IEC/IEEE 8802-11, Nov. 1, 2012, 2798 Pages.

Alcatel, "ETH connection monitoring entities", International Telecommunication Union, COM 13-D 177-E, Telecommunication Standardization Sector, Study Group 13—Delayed Contribution 177, Aug. 29-Sep. 9, 2005, 14 Pages.

Stallings, W., "Data and Computer Communications 7th Edition, Chapter 18, Internet Protocols", Nov. 2, 2007, 48 Pages.

Taekyoung, K., "Data Communications", Data and Communications, Seventh Edition, by William Stallings, date accessed Jun. 11, 2019, 2 Pages.

* cited by examiner

SYSTEMS AND METHODS FOR NON-CELLULAR WIRELESS ACCESS USING LOGICAL ENTITY IDS IN A HYPER CELL

PRIORITY CLAIM AND CROSS-REFERENCE

This application is a continuation of U.S. patent application Ser. No. 14/550,362, filed Nov. 21, 2014, and entitled "Systems and Methods for Non-Cellular Based Radio Access in a Radio Access Network," which claims the benefit of the U.S. Provisional Patent Application No. 61/907,271, filed Nov. 21, 2013, and entitled "System Method and Apparatus for Non-cellular Wireless Access," which applications are hereby incorporated by reference.

TECHNICAL FIELD

The present disclosure relates to a system and method for wireless communications, and, in particular embodiments, to a system and method for non-cellular wireless access in radio access networks.

BACKGROUND

For the past 40 years, the cellular cell has functioned as the atom of the wireless network, as shown in FIG. 1. A cellular system 100 includes a plurality of transmit points (TPs) 104 each with an associated coverage area or cell 102. UEs 106 communicate only with the TP 104 in the cell 102 in which the UE 106 is associated using an ID specific for the cell 102. When a UE 106 moves to another cell, a handover between TPs 104 must occur and the UE 106 is associated with a new TP 104 through a new cell ID. However, radio access performance is limited by inter-cell interference. Further, as shown in plot 200 of spectral efficiency in FIG. 2, there is non-uniform spectral efficiency across a cell.

SUMMARY

In an embodiment, a method for non-cell grid based radio access in a radio access network includes determining, by a controller, a group of transmit points (TPs) to assign to a logical entity; assigning, by the controller, a logical entity identifier (ID) to the logical entity, wherein the logical entity ID identifies the logical entity through which a user equipment (UE) communicates with the radio access network; and causing, by the controller, at least one of the TPs in the logical entity to send signals to the UE.

In an embodiment, a controller for a non-cell grid based radio access in a radio access network includes a processor and a computer readable storage medium storing programming for execution by the processor, the programming including instructions to: determine a group of transmit points (TPs) to assign to a logical entity; assign a logical entity identifier (ID) to the logical entity, wherein the logical entity ID identifies the logical entity through which a user equipment (UE) communicates with the radio access network; and cause at least one of the TPs in the logical entity to send signals to the UE.

In an embodiment, a method in a wireless device for non-cellular wireless access includes receiving a logical identifier (ID) from at least one transmit point (TP) in a radio access network, wherein the logical ID identifies a logical entity in the radio access network, wherein the logical entity comprises a plurality of TPs; determining a dedicated connection ID according to a wireless device ID and the logical entity ID, wherein the wireless device sends signals to and receives signals from the radio access network using the dedicated connection ID regardless of which one or more TPs within the logical entity is serving the wireless device.

In another embodiment, there is provided a method for supporting a connection between a UE and a wireless network that has a plurality of TPs that are assigned to a hyper cell. The hyper cell is associated with the UE and is used to provide the UE access to the wireless network through at least a subset of the plurality of the TPs. The method includes receiving an indication that the membership of the hyper cell should be changed, modifying the membership in accordance with the received indication, and transmitting a notification to a TP that is associated with the modification.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Figure 1:
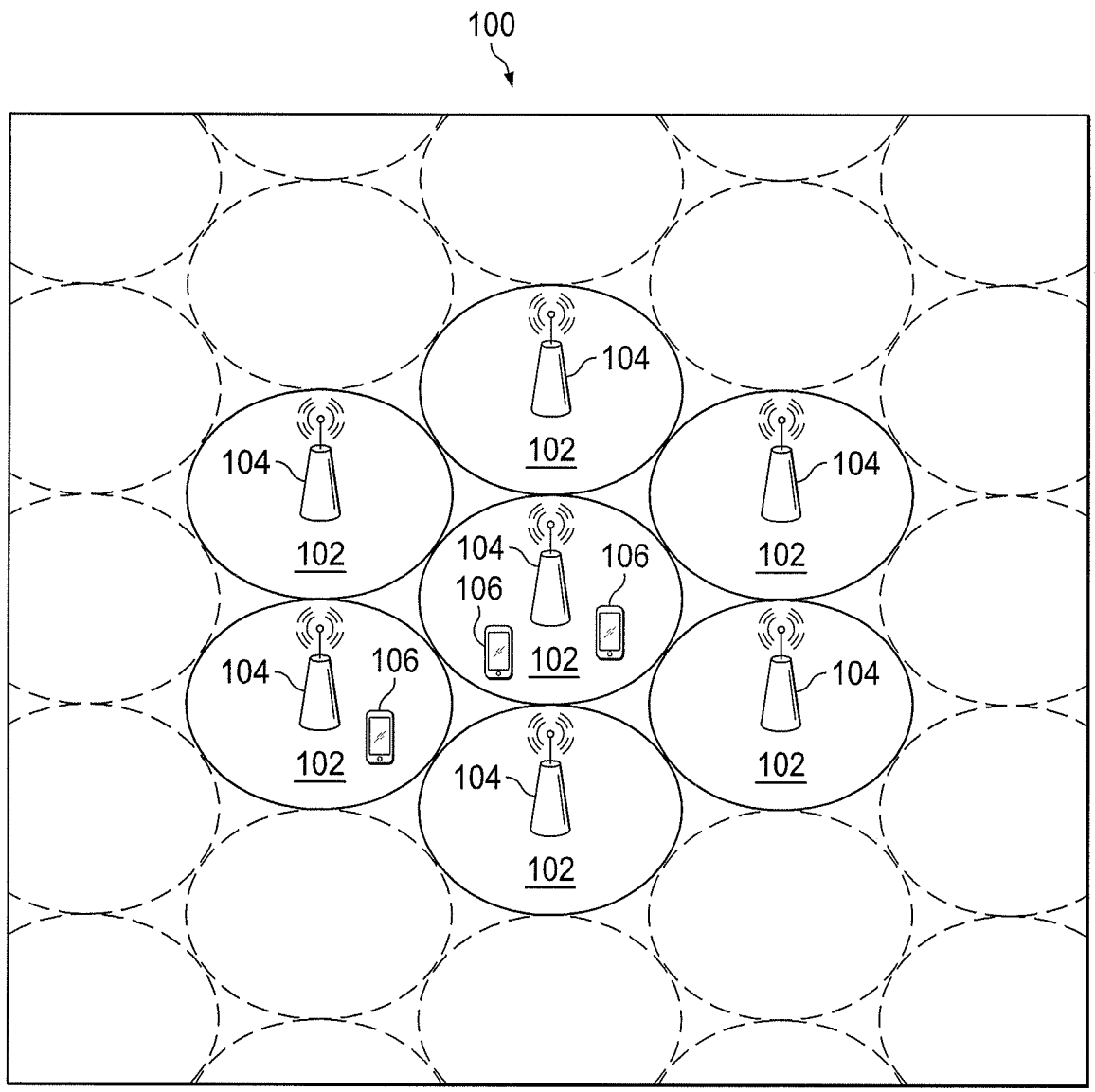
FIG. 1 illustrates a cellular wireless network.
Figure 2:
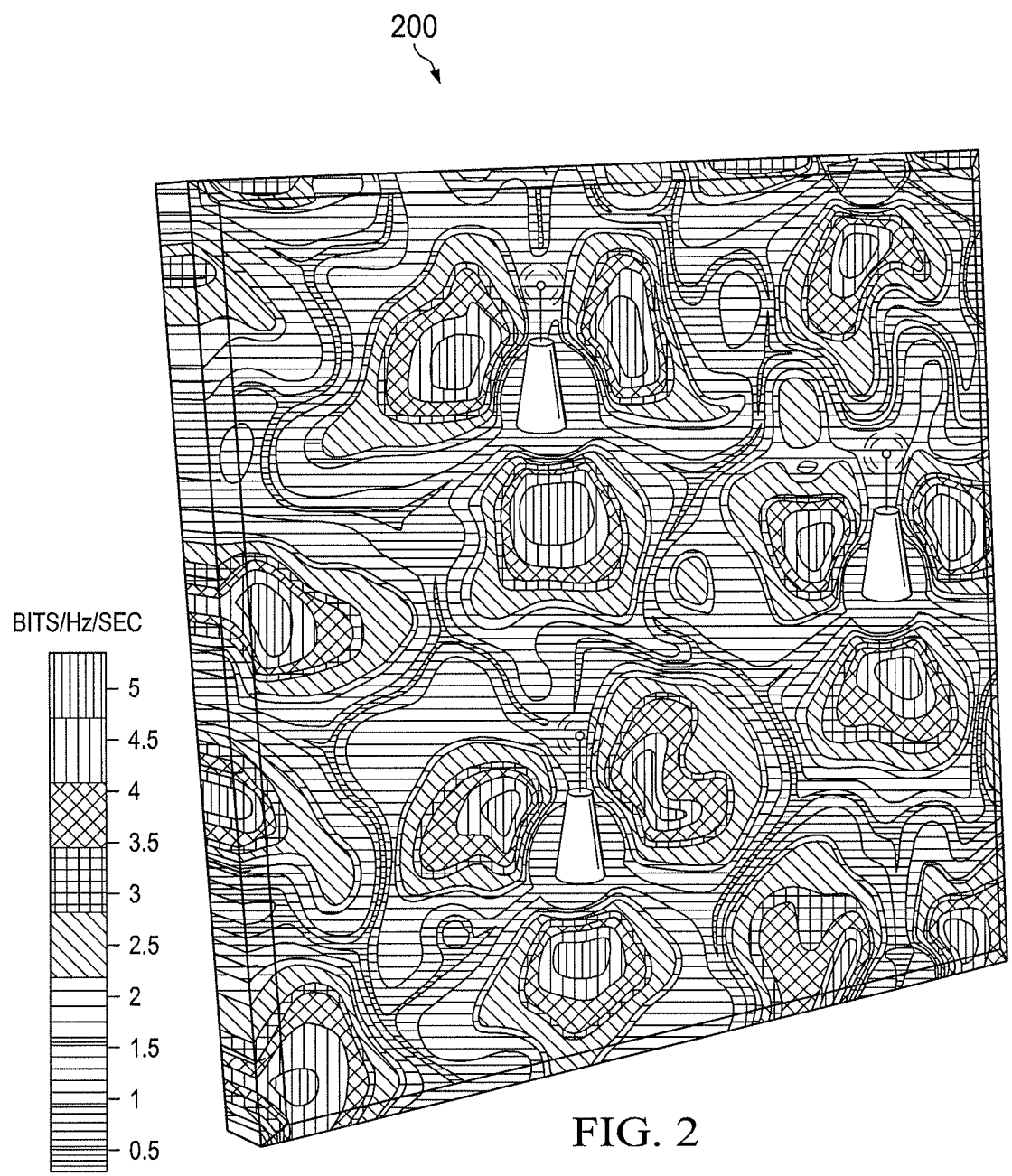
FIG. 2 illustrates spectral efficiency of cellular cells.
Figure 3:
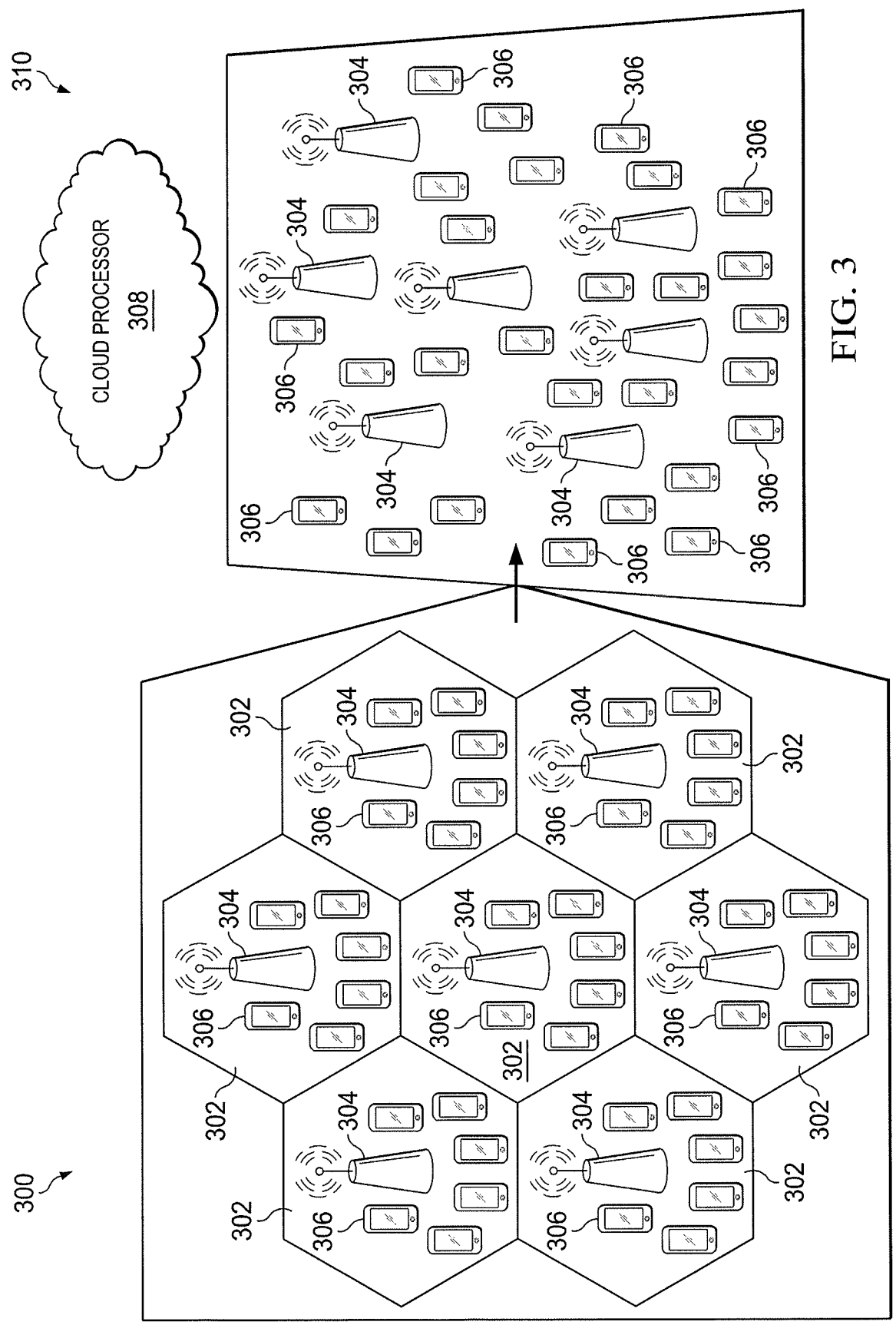
FIG. 3 is a diagram that illustrates a conversion from a cellular system to an embodiment of a non-cellular system.

An embodiment solves the interference issue in a fundamental way by removing the cell boundary to go from cellular to non-cellular, as shown in the example of FIG. 3. An embodiment removes the cell grid. An embodiment removes handover. An embodiment removes the cell ID which is associated with a base station, and instead organizes the system around a user ID associated with the User Equipment. In contrast, the virtual cell or soft cell approach still uses the cell ID to design the air interface, where user equipment (UE) and transmit point (TP) association is based on the cell ID detected by the UE.

An embodiment provides an air interface design to support non-cellular based wireless access. An embodiment uses a UE-centric design instead of a cell-centric design. An embodiment replaces the cell ID with a UE-dedicated connection ID.

In an embodiment, a virtual UE connects to a logical access entity, instead of a physical UE connecting to a physical cell. A UE accesses the network through a logical entity, which allows physical TPs to be transparent to UEs.

An embodiment uses network-oriented measurement, instead of UE-oriented measurement. Because there is no TP-based cell ID, UE and physical TP association can be determined by the network according to uplink (UL) transmission-based measurement.

An embodiment uses a UE-centric adaptive topology instead of a static topology.

In an embodiment, each TP node monitors each UE in its signal range and the central controller assigns a TP to a UE based on signal strength of the UE at the various TPs within range of the UE. The process is transparent to the UE. Once the UE receives a UE dedicated connection ID or a logical entity ID, the UE transmits with the UE dedicated connection ID received or one created by the UE from the logical entity ID while in a coverage area of a logical entity that includes a plurality of TPs. In an embodiment, the UE communicates with the network include its dedicated connection ID which is generated from a logical entity ID and the UE ID. Any of the TPs (or a subset of TPs) in the logical entity that can detect the UE can provide radio access to the UE.

In an embodiment, a method for non-cellular grid based radio access (i.e., non-cell based radio access) in a radio access network includes determining, by a controller, a group of physical transmit points (TPs) to assign to a logical entity; assigning, by the controller, a logical entity identifier (ID) to the group of physical transmit points (TPs) comprising the logical entity; sending, by the controller, the logical entity ID to a UE, wherein the logical entity ID identifies the logical entity within the radio access network through which the UE communicates with the radio access network; and generating, by the controller, a UE-dedicated connection ID according to a UE ID and the logical entity ID, wherein the UE accesses the radio network utilizing the UE-dedicated connection ID through at least one of the TPs in the logical entity.

The UE-dedicated connection ID remains the same as long as the UE is communicating with a TP within the logical entity. Assigning the logical entity ID to a group of physical TPs includes selecting a group of TPs to serve the UE utilizing a UE-TP association table. In an embodiment, the controller dynamically or semi-statically can change the TPs assigned to the logical entity in accordance with at least one of network attributes and UE attributes. In an embodiment, semi-statically changing the TPs assigned to the logical entity means that the TPs assigned to the logical entity change infrequently. In an embodiment, the TPs assigned to the logical entity change periodically. The controller can make a determination as to whether to change the TPs assigned to the logical entity either periodically or in response to changing conditions. In an embodiment, the controller makes a decision as to whether to change the TPs assigned to the logical entity aperiodically in response to changes in network conditions, TP status, or some other criteria. The network attributes may include at least one of a number of active UEs within the radio access network, network congestion, network power consumption, and the type of network traffic. In an embodiment, the controller dynamically determines a second group of TPs (e.g., physical TPs and/or virtual TPs) to assign to the logical entity where at least some of the TPs in the original and the second groups do not belong to both groups. In an embodiment, the controller powers down at least one of the TPs in the group. This may be done, for example, to reduce power consumption when there are fewer UEs actively accessing the network or less traffic through the radio access network. The logical entity can provide wireless access for a coverage area that is larger than the coverage area for a single TP.

In an embodiment, the controller sends a second logical entity ID associated with a second logical entity to the UE when the UE travels out of a coverage area for the original logical entity and into a coverage area for the second logical entity. The second logical entity includes a second group of TPs where at least some of the TPs in the second group are different from at least some of the TPs in the original group (i.e., the second logical entity includes at least one non-overlapping coverage area with the coverage area of the first logical entity).

In an embodiment, the controller generates a UE-TP relation table in accordance with uplink (UL) measurements from the UE. In an embodiment, building the UE-TP relation table is performed using sounding signals and/or data signals from the UE. The controller sends control and/or data to the UE through a UE-centric channel via at least one of the TPs in the logical entity. In an embodiment, the controller assigns one or more of the TPs in the group to provide radio access to the UE. In an embodiment, the TPs in the group assigned to provide radio access to the UE is determined according to relative signal strength of the UE at each of the TPs in the group.

In an embodiment, a controller executes a method for non-cellular wireless access that includes receiving measured signal strengths of a user equipment (UE) from a plurality of transmit points (TPs); generating a UE neighborhood table according to the measured signal strengths and TPs detecting the UE; creating a logical entity or determining an identity of a logical entity to serve the UE, wherein the logical entity comprises a plurality of TPs; selecting one of the TPs from the plurality of TPs to provide radio access to the UE; and sending control information and/or data to the UE via the selected TP(s) through a UE centric channel. In an embodiment, the controller dynamically determines, from the logical entity, a new TP to provide radio access to the UE in response to a change in relative signal strengths between the TPs in the logical entity. In an embodiment, the controller determines the TP(s) that can best serve an individual UE. Depending on the location of a UE, sometimes, more than one TP can serve the UE cooperatively. For example, if a UE can receive a strong signal from several TPs nearby, these TPs can transmit the same data to this UE in a cooperative manner such that the joint signals reaching the UE significantly improve the user experience. In an embodiment, the controller dynamically determines, from the logical entity, a new TP to provide radio access to the UE for load balancing in response to changes in the loads on the TPs in the logical entity.

FIG. 3 is a diagram that illustrates a conversion from a cellular system 300 to an embodiment non-cellular system 310. The cellular system 300 includes a plurality of a TPs 304 each with an associated cell 302. Each UE 306 connects only with the TP 304 within the cell 302 in which the UE 306 is located. Although the UE 306 can receive data signals from more than one TP, the control signals to the UE 306 can only come from the serving TP 304 within the cell 302 in which the UE 306 is located.

Non-cellular system 310 includes a plurality of TPs 304, UEs, 306, and a cloud processor 308. As used herein, the term TP may also be referred to as an access point (AP) and the two terms may be used interchangeably throughout this disclosure. The TPs 304 may include any component capable of providing wireless access by establishing uplink and/or downlink connections with the UEs 306, such as a base transceiver station (BTS), a NodeB, an enhanced NodeB (eNB), a femtocell, and other wirelessly enabled devices. The UEs 306 may comprise any component capable of establishing a wireless connection with the TPs 304. The TPs 304 may be connected to the cloud processor via a backhaul network (not shown). The backhaul network may be any component or collection of components that allow data to be exchanged between the TPs 304 and the cloud processor 308 and/or a remote end (not shown). In some embodiments, the network 100 may comprise various other wireless devices, such as relays, femtocells, etc. The cloud processor may be any type of data processing system capable of performing the processes disclosed below and capable of communication with other devices.

In non-cellular system 310, the TPs 304 are not associated with a cell. The system 310 includes a cloud processor 308 which organizes the TPs 304 into logical entities. Each UE 306 is assigned to a logical entity and is assigned a unique UE dedicated connection ID. In an embodiment, the UE can be a mobile phone, a sensor, a smart phone, or other wireless device. The UE 306 may move freely within an area serviced by a single logical entity without acquiring a new UE dedicated connection ID. Each TP 304 monitors signal strengths for any UE 306 detectable by the TP 304 and sends this data to the cloud processor 308. The cloud processor creates a logical entity or determines the identity of a logical entity to be assigned to serve each UE according to the measured signal strengths measured by the TPs 304. This determination can be performed dynamically in some embodiments. The cloud processor 308 assigns a logical entity ID to the logical entity and assigns a UE dedicated connection ID to each UE 306 according to the logical entity ID to which the UE 306 is assigned and the UE ID of the UE 306. In an embodiment, the UE 306 obtains the logical entity ID from the network and generates a dedicated connection ID from the logical entity ID and the UE ID. In this scenario, the network does not need to assign a UE dedicated connection ID to the UE 306. However, in either case, the communication between the UE 306 and the network is based on the dedicated connection ID. This UE dedicated connection ID is used by the UE when transmitting and receiving. The cloud processor 308 selects one of the TPs 304 from the group of TPs 304 in the logical entity to provide radio access to the UE 306 based on its dedicated connection ID. In an embodiment, the cloud processor 308 selects the TP 304 based on relative signal strengths of the UE 306 at each of the TPs 304 in the logical entity and/or the loads of each TP 304 in the logical entity. In other embodiments, other selection criteria can be utilized. In an embodiment, the cloud processor 308 dynamically reassigns a new TP 304 in the logical entity to serve the UE 306 based on changes to the signal strength of the UE at each TP 304 in the logical entity. The change in signal strength may be due to UE mobility or to other factors.

In an embodiment, the cloud processor 308 can enable or disable one or more TPs 304 covered by a logical entity to reach a substantially best tradeoff between the service quality provided to all covered UEs 306 and energy saving criteria.

In an embodiment, the cloud processor 308 determines the TPs 304 to be assigned to a logical entity based on the geographic location of the TPs 304. In another embodiment, the cloud processor 308 determines the TPs 304 to be assigned to a logical entity based on the user distribution, application types and traffic loads.

In an embodiment, the TPs 304 assigned to a logical entity may be changed dynamically by the cloud processor 308 according to changes in network conditions. For example, at times of low radio access network utilization, some of the TPs 304 may be powered down to conserve power. At times of higher network utilization, more TPs 304 may be powered up in order to more efficiently serve the UEs 306 in the area and reduce congestion.

In an embodiment, the TPs 304 assigned to a logical entity may be enabled/disabled (e.g., powered on or off) in a distributed manner as determined by a TP's 304 measurement of certain parameters (e.g., UEs 306 covered by the TP) and the communications between TPs 304. Determining which TP 304 should be turned on or off could depend on various factors such as, for example, the UE 306 and TP 304 association relationship, UE 306 distribution, the Quality of Service (QoS) required, energy saving, etc.

Figure 4:
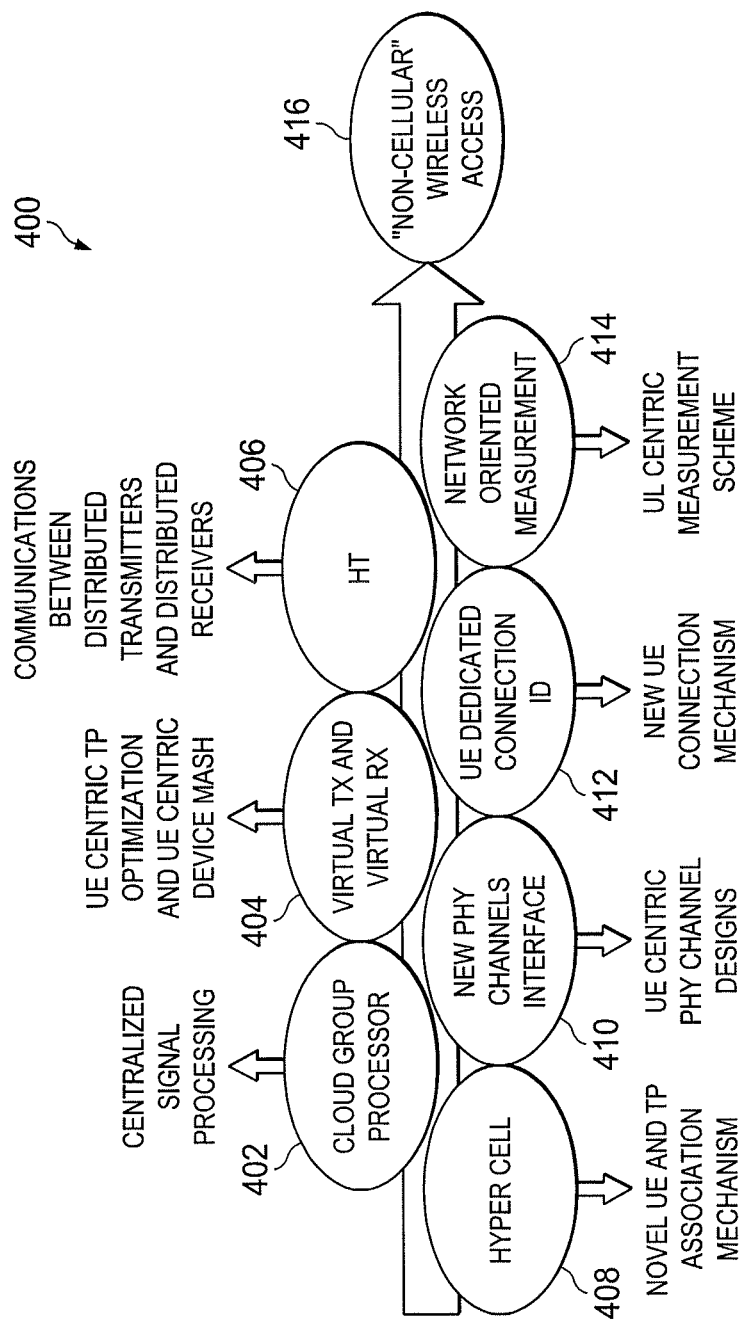
FIG. 4 illustrates an embodiment of a system of components enabling non-cellular wireless access.

FIG. 4 illustrates an embodiment of a system 400 of components enabling non-cellular wireless access. In an embodiment, the system includes a cloud group processor 402, a virtual Tx and virtual Rx component 404, a Hyper Transceiver (HT) component 406, a hyper cell 408, new physical (PHY) channels interface 410, a UE dedicated connection ID component 412, and a network oriented measurement system 414 to provide non-cellular wireless access to wireless devices. The cloud group processor 402 provides centralized signal processing. The virtual Tx and virtual Rx 404 provide UE centric TP optimization and UE centric device mash. The HT component 406 provides communications between distributed transmitters and distributed receivers. The hyper cell 408 provides a novel UE and TP association mechanism. The new PHY channels interface 410 provide a UE centric PHY channel designs. The UE dedicated connection ID component 412 generates a UE dedicated connection ID and provides a UE connection mechanism. The network oriented measurement 414 provides a UL centric measurement scheme.

Figure 5:
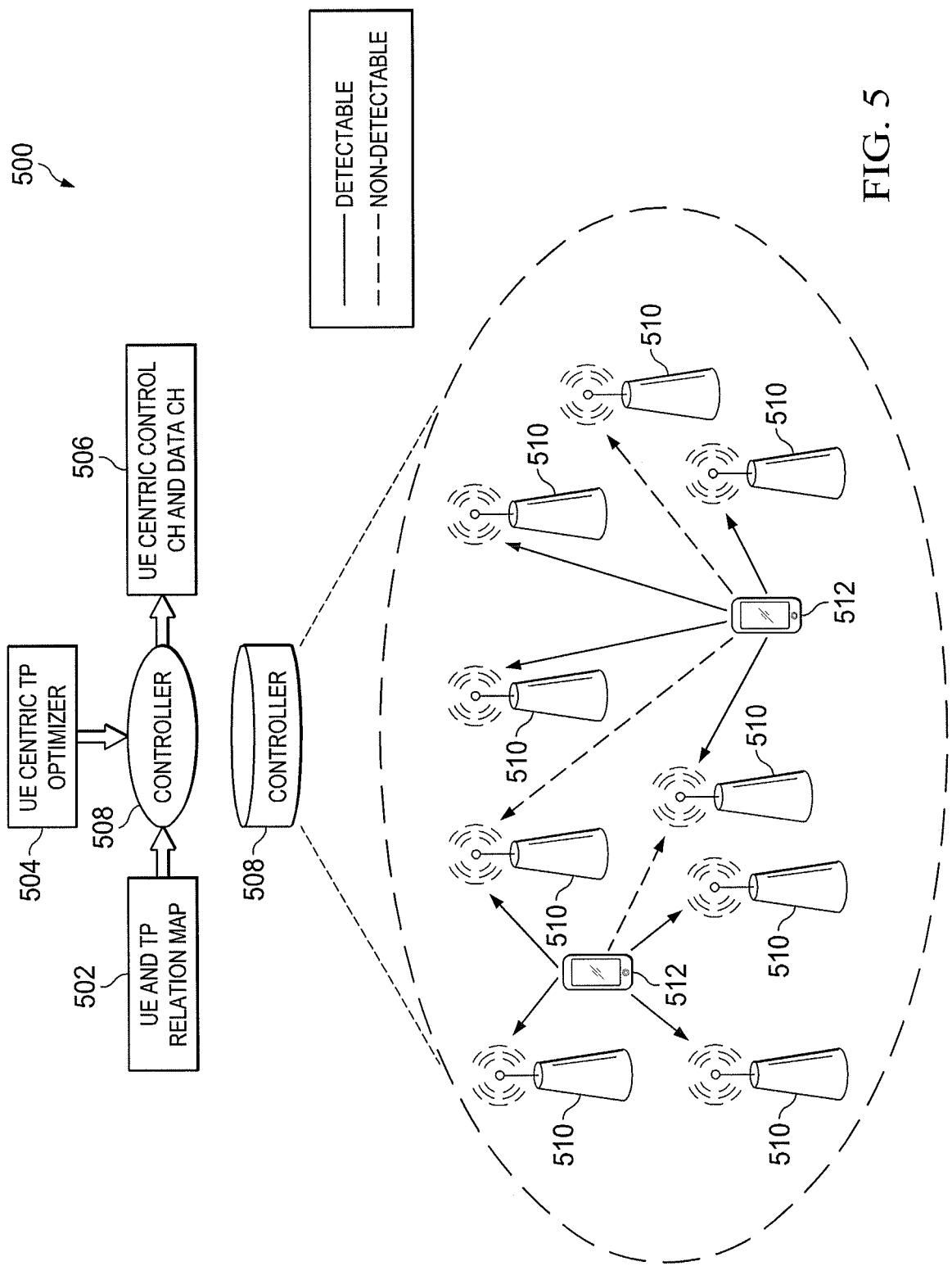
FIG. 5 illustrates an embodiment of a non-cellular wireless access system.

FIG. 5 illustrates an embodiment of a non-cellular wireless access system 500. System 500 includes a plurality of TPs 510 and UEs 512. System 500 also includes a controller 508 in communication with the TPs 510. Each UE 512 is detectable by some of the TPs 510 (represented by solid lines) and not detectable by other TPs 510 (represented by dashed lines). The controller 508 uses a UE and TP relation map 502 and a UE-centric TP optimizer 504 to provide an output of a method to the controller 508. From this, the controller 508 determines a UE-centric control channel and data channel 506. The UE and TP relation map indicates which UEs 512 are detectable by which TPs 510 and can, in some embodiments, provide the relative signal strengths of each UE 512 at each TP 510. The UE centric TP optimization scheme 504 may utilize factors such as relative signal strength, network load at each TP 510, network power consumption, TP power consumption, quality of service requirements, as well as other factors to determine a UE centric control channel and data channel 506. The control channel and data channel may come from the same TP (or TPs) or from different TP(s). The controller 508 also determines which of the TPs 510 should serve a respective UE 512. Membership in the set of TP 510 serving a particular UE 512 may change dynamically or semi-statically over time as determined by the controller 508 in response to changing network, TP 510, and/or UE 512 conditions, and traffic condition. The UE 512 need not know the ID of a particular TP 510 that it is transmitting to, but rather merely communicates with the system 500 without needing to know which physical TP 510 is actually serving the UE 512. Once the UE centric control channel and data channel are determined by the controller 508, the control and data signals are sent to the UE 512. The UE 512 uses its dedicated connection ID which is associated with logical entity ID for all communication within the network as long as the UE 512 is in the area serviced by the logical entity. The UE 512 does not need to know which TP 510 is serving it. The UE 512 merely transmits on the UE centric channel and receives signals on the UE centric channel regardless of which TP 510 transmits. The UE 512 may move freely within the area serviced by the logical entity without changing a UE dedicated communication ID. The controller 508 will change the TP 510 serving the UE 508 dynamically and transparently to the UE 510 to accommodate UE 512 mobility.

Figure 6:
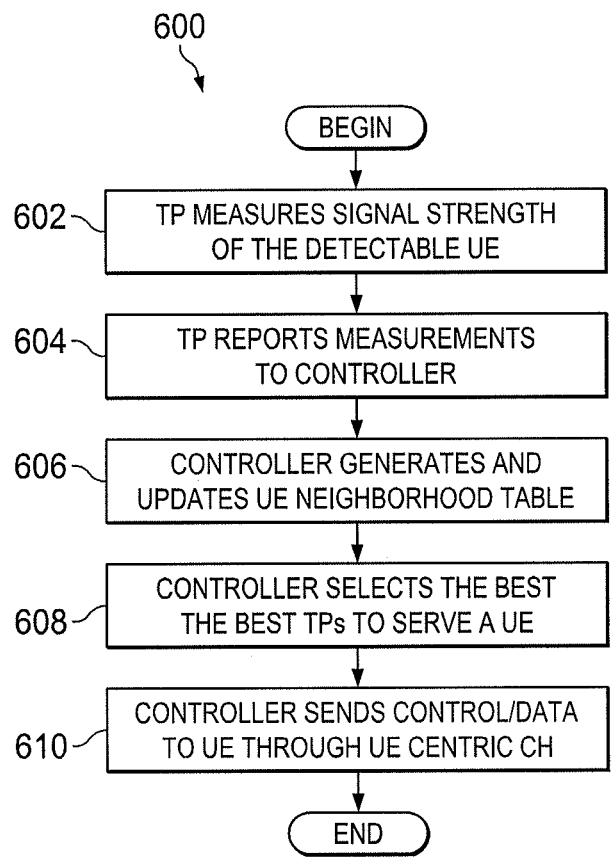
FIG. 6 is a flowchart illustrating an embodiment of a method for non-cellular wireless access.

FIG. 6 is a flowchart illustrating an embodiment of a method 600 for non-cellular wireless access. The method 600 begins at block 602 where a TP measures signal strength of a detectable UE. At block 604, the TP reports the measurements to a controller. At block 606, the controller generates and updates a UE neighborhood table. At block 608, the controller selects the TPs to serve the UE. The TP or TPs selected to serve the UE may be the TP or TPs determined to be the best or substantially the best according to various criteria used by the controller. At block 610, the controller sends control/data to the UE through a UE-centric channel (CH), after which, the method 600 ends. In an embodiment, the method 600 may be encoded as a set of computer readable instructions and stored on a computer readable storage media that, when implemented by a data processing system, causes the data processing system to execute the method 600.

Figure 7:
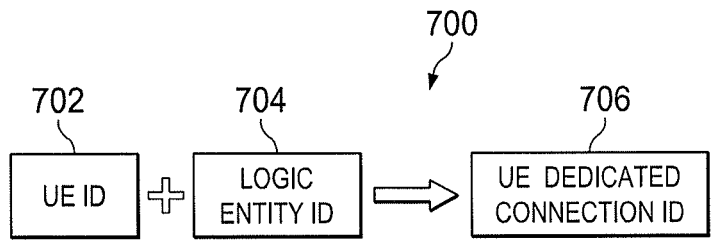
FIG. 7 is a flowchart illustrating an embodiment of a method for the formation of a UE-dedicated connection ID.

FIG. 7 is a flowchart illustrating an embodiment of a method 700 for the formation of a UE-dedicated connection ID. With respect to a logical entity ID, a logical entity covers a group of physical TPs. The coverage area of the logical entity can be configured dynamically by the network according to network topology, UE distribution, load distribution, and energy consumption expectation. Each logical entity is assigned an logical entity ID 704. The logical entity ID 704 can be used to manage interference of the transmission of broadcast singling and common control signaling. It can also be applied to generate synchronization signal. For example, the reference signals carried by the synchronization channel can be generated from the logical entity ID. The method 700 combines the UE ID 702 with the logical entity ID 704 to generate a UE dedicated connection ID 706.

Generation and management of UE dedicated connection ID 706 can enable efficient UE-centric access and measurement, and allow for optimization of resource allocation, such as UL resource reuse. As discussed above, a UE dedicated connection ID 706 is generated from a UE ID 702 and a logical entity ID 704. A UE obtains a logical entity ID 704 from the network through blind sequence detection during initial access (for example the detection of Synchronization reference signals), or downlink (DL) signaling. It may be carried by a broadcast signal, carried by a common control signal, carried by a UE-special signal, for example when moving to the coverage of a neighboring logical entity, and the like.

For UE and TP association relation map generation, a UE accesses the network based on a network synchronization channel. The synchronization channel no longer needs to carry the cell-ID as in older cellular access based wireless technologies. In an embodiment, the synchronization channel carries the logical entity ID. Timing for the UE synchronizes to the strongest path or to the average of the strongest paths.

A UE is assigned a UE dedicated connection ID 706 after initial access. Each TP monitors a UL sounding signal or keep-alive signaling associated with the UE dedicated connection ID to obtain signal strength information of the detected UEs. Each TP reports the measurement results to the controller. The report can be periodic, or it can be generated when measurements change more than a predetermined amount. The controller generates and maintains a UE and TP relation table including neighborhood TPs for each UE.

Figure 8:
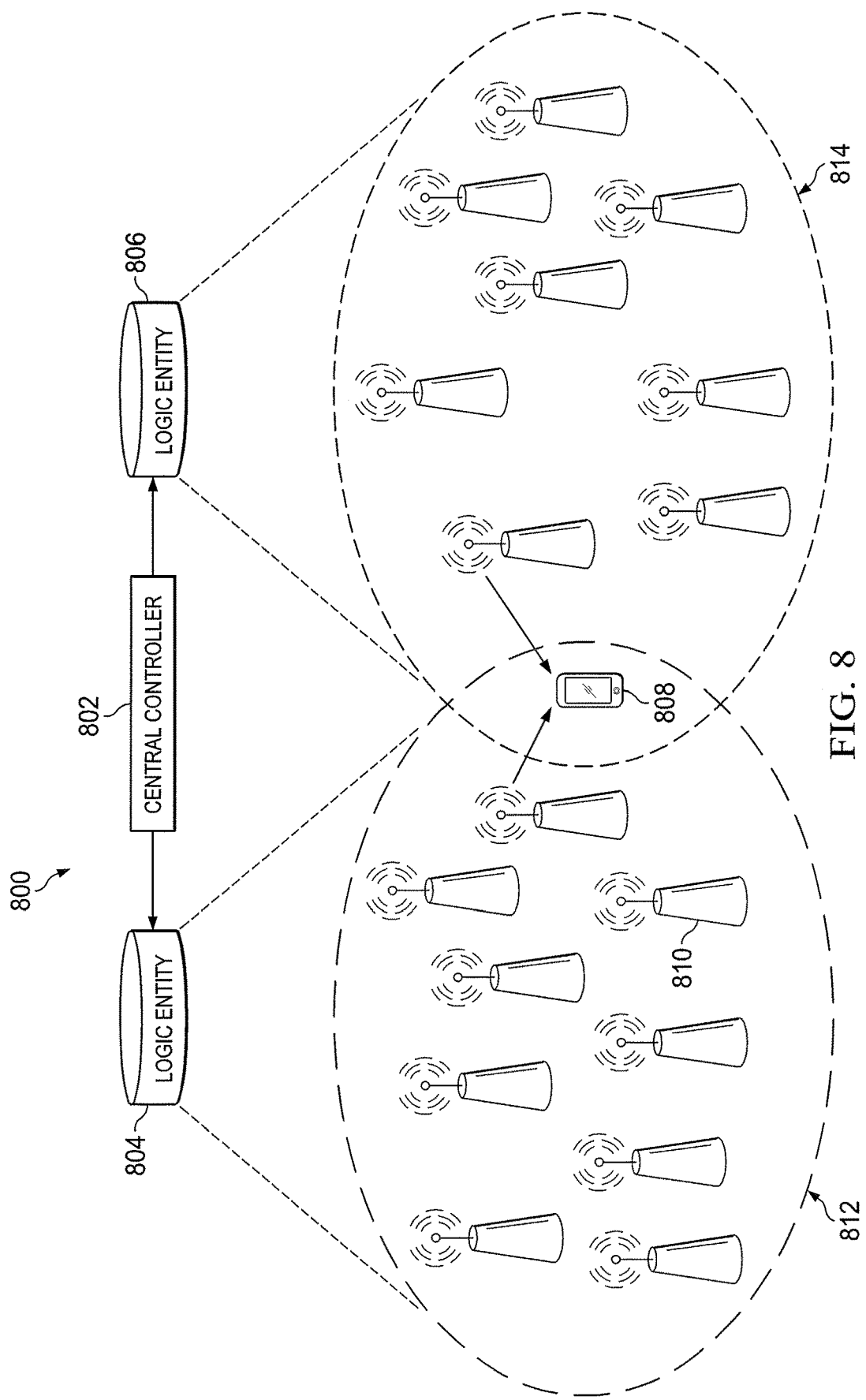
FIG. 8 is a diagram illustrating an embodiment of a hyper cell system.

FIG. 8 is a diagram illustrating an embodiment of a non-cellular radio access system 800. The central controller 802 covers multiple logical entities 804, 806. Each logical entity 804, 806 include a plurality of TPs 810. One skilled in the art will appreciate that it is possible in some embodiments for a logical entity to only include a single TP. There is a transparent boundary between the coverage of neighboring logical entities 804, 806. The system 800 supports seamless UE mobility, where the UE 808 use the latest received logical entity ID. The UE 808 is within the coverage area of logical entity 804 and to logical entity 806. In an embodiment, one or more TPs 810 may belong to both logical entities 804, 806. A hyper cell 812, 814 defines a coverage area provided by a logical entity 804, 806. In an embodiment, the coverage area defined by the hyper cell 812, 814 is equivalent to the coverage area provided by the combination of TPs 810 in the logical entity 804, 806 corresponding to the hyper cell 812, 814. In an embodiment, the coverage area defined by the hyper cell 812, 814 includes an area that is smaller than all the coverage area provided by the combination of TPs 810 in the logical entity 804, 806 corresponding to the hyper cell 812, 814.

An embodiment provides a wireless network free from traditional inter-cell interference. An embodiment provides higher spectrum efficiency, higher network capacity, a fairer UE experience, and lower energy consumption. Embodiments may be implemented in wireless networks, such as a fifth generation (5G) wireless network and the like.

Figure 9:
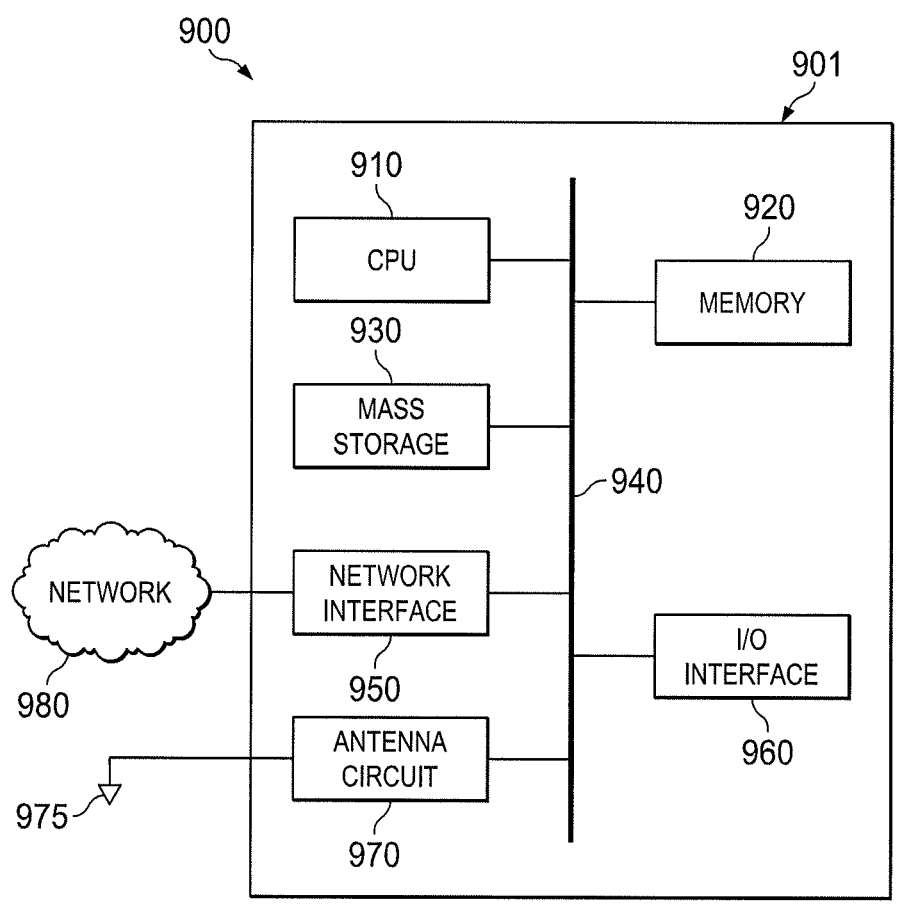
FIG. 9 illustrates a computing platform that may be used for implementing, for example, the devices and methods described herein, in accordance with an embodiment.

FIG. 9 is a block diagram of a processing system 900 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, an I/O interface 960, and an antenna circuit 970 connected to a bus 940. The processing unit 901 also includes an antenna element 975 connected to the antenna circuit.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901 and additional or fewer interface cards may be utilized. For example, a serial interface such as Universal Serial Bus (USB) (not shown) may be used to provide an interface for a printer.

The antenna circuit 970 and antenna element 975 may allow the processing unit 901 to communicate with remote units via a network. In an embodiment, the antenna circuit 970 and antenna element 975 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 970 and antenna element 975 may also provide Bluetooth and/or WiFi connection to other devices.

The processing unit 901 may also include one or more network interfaces 950, which may comprise wired links, such as an Ethernet cable or the like, and/or wireless links to access nodes or different networks. The network interface 901 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

As will be appreciated by those skilled in the art, many existing mobile networks are built around a cell-based structure. As a mobile device moves from one cell to another, the device is subject to a handover which introduces overhead in the network. At the edge of one cell, a UE is subject to intercell interference from adjacent cells. In a particular scenario a UE at the boundary of two cells can be subject to large amounts of intercell interference and possibly repeated handovers between the two cells.

Fast moving UEs, in areas covered by small cell deployments, are subjected to a large number of handovers in short time periods which adversely impacts both the network and the UE's ability to maintain a reliable data connection.

To address these issues, the above described techniques can be used to enable a mobile wireless network where a UE initiates a connection, and in response, a central entity associates a plurality of transmit points with the UE. This plurality of transmit points can be based on a UE-TP association table that is built based on individual TPs reporting signal characteristics associated with transmissions received from the UE. It should be understood that the logical entity created to co-ordinate the activities of the plurality of transmit points associated with the UE can be given a number of different names including a hyper cell. At least one TP in the hyper cell should be able to transmit signals to and receive signals from the UE. It should be recognized that in practice it is likely that a number of TPs in the hyper cell will be able to "see" the UE, which should be understood to mean that the TP can form a radio communication channel with the UE. It should also be understood that the hyper cell can include TPs that cannot currently see the UE. This allows the UE to move a greater distance while still being under the coverage area of the hyper cell.

As a UE moves, the channel characteristics to different TPs in the hyper cell will change. A central controller can use this information (which may include explicit location information provided by the UE such as GPS co-ordinates or location information ascertained in accordance with detection of radio resources such as base stations and WiFi access points) to modify the membership of the hyper cell. This allows a network entity to remove TPs that the UE is unlikely to need access to from the hyper cell and add other TPs that the UE has a higher likelihood to need access to. In one example, as a UE moves along a road, TPs that the UE is moving away from can be removed from the hyper cell while TPs that the UE is moving towards can be added to the hyper cell.

By having multiple TPs that can see the UE as a part of the same hyper cell, intercell interference can be mitigated by co-operatively serving the needs of the UE. Additionally, by having the membership of the hyper cell change as the UE moves with respect to the topology of the network, the number of handovers that the UE is subjected to can be reduced, and possibly eliminated.

One skilled in the art will appreciate that modifications to the membership of a hyper cell may be performed as a result of predicted changes to characteristics of UE connectivity. For example, it may be determined by a network planning routine that a particular TP should be powered down to save energy. When the TP to be powered down is identified as part of a hyper cell serving a particular UE, the hyper cell membership can be modified and the TP can be removed from the logical entity. In doing so, network traffic associated with the UE will no longer be routed to the TP. This can be done prior to the powering down of the TP so that adverse effects on connected UEs can be minimized. Although discussion herein has focused on powering down a TP, any Operations And Maintenance (O&M or O&AM) function.

Additionally, where it has been discussed that a hyper cell membership can be changed due to the removal of a TP for service or power savings functions, it should also be noted that hyper cell membership can also be modified in response to a TP being powered on (or in response to advanced notice that a TP is going to be powered on).

When a UE attaches to the network, the hyper cell created to serve the UE can be assigned an identifier. The UE can be provided an identifier of the hyper cell so that it can include this identifier will all transmissions it sends. It should be recognized that the assigned identifier should be unique across the network (globally unique). The UE may receive either all or part of the hyper cell identifier, but in cases where it only receives a portion of the identifier, the UE should be able to programmatically determine the whole identifier. Those skilled in the art will appreciate that the assigned identifier will be globally unique if it includes a UE identifier which is guaranteed to be unique.

It should also be understood that although the above described methods allow for an elastic hyper cell which can be used to eliminate handovers, it is also possible for a network to make use of the elastic hyper cell, but to also define boundaries that will result in the UE needing to be handed over to a new hyper cell. Such a transfer may require handover processes, and the resulting network would still have a somewhat cellular nature.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:
   obtaining, by an apparatus, an identifier of a hyper cell in accordance with detection of a synchronization signal, wherein the identifier of the hyper cell is common to a plurality of transmit points in a coverage area of the hyper cell;
   obtaining, by the apparatus, an apparatus-dedicated connection ID based on the identifier of the hyper cell common to the plurality of transmit points, wherein the apparatus-dedicated connection ID is common to the plurality of transmit points;
   communicating, by the apparatus, data with a first transmit point in the plurality of transmit points based on the apparatus-dedicated connection ID; and
   communicating, by the apparatus, second data with a second transmit point in the plurality of transmit points based on the apparatus-dedicated connection ID in response to the apparatus moving from a first position in the coverage area of the hyper cell to a second position in the coverage area of the hyper cell.

2. The method of claim 1, wherein the obtaining, by the apparatus, the apparatus-dedicated connection ID based on the identifier of the hyper cell comprises:
   generating, by the apparatus, the apparatus-dedicated connection ID, based on the identifier of the hyper cell and an identifier of the apparatus.

3. The method of claim 1, wherein a serving transmit point in the plurality of transmit points is transparent to the apparatus, and wherein the serving transmit point is one of the first transmit point or the second transmit point.

4. The method of claim 1, wherein the identifier of the hyper cell is not associated with a physical cell only covered by one transmit point of the plurality of transmit points.

5. The method of claim 1, wherein the identifier of the hyper cell is a first identifier, and the hyper cell is a first hyper cell, the method further comprising:
   obtaining, by the apparatus, a second identifier of a second hyper cell when the apparatus moves into an area covered by the second hyper cell, the second identifier being different from the first identifier and being common to a second plurality of transmit points in the area covered by the second hyper cell; and
   communicating, by the apparatus, with the second plurality of transmit points in accordance with a second apparatus-dedicated connection ID obtained based on the second identifier of the second hyper cell.

6. The method of claim 5, further comprising:
   obtaining, by the apparatus, the second apparatus-dedicated connection ID based on the second identifier of the second hyper cell and an identifier of the apparatus.

7. The method of claim 5, wherein the second identifier of the second hyper cell is not associated with a physical cell only served by one transmit point of the second plurality of transmit points in the area covered by the second hyper cell.

8. The method of claim 1, further comprising:
   communicating, by the apparatus, data signals and control signals with the plurality of transmit points based on the apparatus-dedicated connection ID.

9. The method of claim 1, wherein changing from the communicating the data with the first transmit point to the communicating the second data with the second transmit point is transparent to the apparatus.

10. An apparatus, comprising:
    at least one processor; and
    a non-transitory computer readable storage medium storing programming for execution by the at least one processor, the programming including instructions for:
      obtaining an identifier of a hyper cell in accordance with detection of a synchronization signal, wherein the identifier of the hyper cell is common to a plurality of transmit points in a coverage area of the hyper cell;
      obtaining an apparatus-dedicated connection ID based on the identifier of the hyper cell common to the plurality of transmit points, wherein the apparatus-dedicated connection ID is common to the plurality of transmit points;
      communicating data with a first transmit point in the plurality of transmit points based on the apparatus-dedicated connection ID; and
      communicating second data with a second transmit point in the plurality of transmit points based on the apparatus-dedicated connection ID in response to the apparatus moving from a first position in the coverage area of the hyper cell to a second position in the coverage area of the hyper cell.

11. The apparatus of claim 10, the obtaining the apparatus-dedicated connection ID based on the identifier of the hyper cell comprises:
    generating the apparatus-dedicated connection ID based on the identifier of the hyper cell and an identifier of the apparatus.

12. The apparatus of claim 10, wherein a serving transmit point in the plurality of transmit points is transparent to the apparatus, and wherein the serving transmit point is one of the first transmit point or the second transmit point.

13. The apparatus of claim 10, wherein the identifier of the hyper cell is not associated with a physical cell only covered by one transmit point of the plurality of transmit points.

14. The apparatus of claim 10, wherein the identifier of the hyper cell is a first identifier, and the hyper cell is a first cell, the programming further including instructions for:
    obtaining a second identifier of a second hyper cell when the apparatus moves into an area covered by the second hyper cell, the second identifier being different from the first identifier and being common to a second plurality of transmit points in the area covered by the second hyper cell; and
    communicating with the second plurality of transmit points in accordance with a second apparatus-dedicated connection ID obtained based on the second identifier of the second hyper cell.

15. The apparatus of claim 14, the programming further including instructions for:
    obtaining the second apparatus-dedicated connection ID based on the second identifier of the second hyper cell and an identifier of the apparatus.

16. The apparatus of claim 14, wherein the second identifier of the second hyper cell is not associated with a physical cell only served by one transmit point of the second plurality of transmit points in the area covered by the second hyper cell.

17. The apparatus of claim 10, wherein changing from the communicating the data with the first transmit point to the communicating the second data with the second transmit point is transparent to the apparatus.

18. A non-transitory computer-readable medium storing computer instructions, that when executed by one or more processors, cause an apparatus to perform operations of:
   obtaining an identifier of a hyper cell in accordance with detection of a synchronization signal, wherein the identifier of the hyper cell is common to a plurality of transmit points in a coverage area of the hyper cell;
   obtaining an apparatus-dedicated connection ID based on the identifier of the hyper cell common to the plurality of transmit points, wherein the apparatus-dedicated connection ID is common to the plurality of transmit points;
   communicating data with a first transmit point in the plurality of transmit points based on the apparatus-dedicated connection ID; and
   communicating second data with a second transmit point in the plurality of transmit points based on the apparatus-dedicated connection ID in response to the apparatus moving from a first position in the coverage area of the hyper cell to a second position in the coverage area of the hyper cell.

19. The non-transitory computer-readable medium of claim 18, the obtaining the apparatus-dedicated connection ID based on the identifier of the hyper cell comprises:
   generating the apparatus-dedicated connection ID based on the identifier of the hyper cell and an identifier of the apparatus.

20. The non-transitory computer-readable medium of claim 18, wherein a serving transmit point in the plurality of transmit points is transparent to the apparatus, and wherein the serving transmit point is one of the first transmit point or the second transmit point.

21. The non-transitory computer-readable medium of claim 18, wherein the identifier of the hyper cell is not associated with a physical cell only served by one transmit point of the plurality of transmit points.

22. The non-transitory computer-readable medium of claim 18, wherein the identifier of the hyper cell is a first identifier, and the hyper cell is a first cell, the operations further comprising:
   obtaining a second identifier of a second hyper cell when the apparatus moves into an area covered by the second hyper cell, the second identifier being different from the first identifier and being common to a second plurality of transmit points in the area covered by the second hyper cell; and
   communicating with the second plurality of transmit points in accordance with a second apparatus-dedicated connection ID obtained based on the second identifier of the second hyper cell.

23. The non-transitory computer-readable medium of claim 22, the operations further comprising:
   obtaining the second apparatus-dedicated connection ID based on the second identifier of the second hyper cell and an identifier of the apparatus.

* * * * *